United States Patent [19]

Fujimoto

[11] 4,379,119
[45] Apr. 5, 1983

[54] APPARATUS FOR SUPPORTING CORE CONSTITUTING ELEMENTS IN NUCLEAR REACTOR CORE

[75] Inventor: Shigeru Fujimoto, Yokohama, Japan

[73] Assignee: Tokyo Shibaura Denki Kabushiki Kaisha, Kanagawa, Japan

[21] Appl. No.: 207,010

[22] Filed: Nov. 13, 1980

[30] Foreign Application Priority Data

Nov. 20, 1979 [JP] Japan .................. 54-149574

[51] Int. Cl.³ .............................. G21C 9/00
[52] U.S. Cl. ................................... 376/302
[58] Field of Search ............ 376/302, 304, 285

[56] References Cited

FOREIGN PATENT DOCUMENTS 585879 10/1959 Canada ................... 376/304
608030 11/1960 Canada ................... 376/304
854144 11/1960 United Kingdom ........ 376/304

*Primary Examiner*—Harvey E. Behrend
*Attorney, Agent, or Firm*—Stevens, Davis, Miller & Mosher

[57] ABSTRACT

Apparatus for supporting a nuclear reactor core comprises a support frame for supporting core elements and a friction damper through which the support frame is secured to an inner wall of a reactor vessel. The friction damper comprises a first and second cylindrical members which are loosely telescoped with each other, and the first cylindrical member is connected to the support frame and the second cylindrical member is secured to the inner wall of the reactor vessel. Within the telescoped cylindrical members is disposed a ring spring so as to absorb collision energy.

2 Claims, 4 Drawing Figures

APPARATUS FOR SUPPORTING CORE CONSTITUTING ELEMENTS IN NUCLEAR REACTOR CORE

BACKGROUND OF THE INVENTION

This invention relates to apparatus for supporting a nuclear reactor core.

In a nuclear reactor, for example a fast breeder reactor, liquid sodium of a high temperature of about 500–600° C. fills the inside of the reactor core, in which several hundreds of hexagonal core elements are accommodated. The hexagonal core elements are supported at their lower ends by supporting plates disposed at the lower portion of the reactor core and their upper ends are constituted to move freely. Each of core support frames surrounds a group of core elements and holds them at their upper and intermediate portions so as to suppress deflection or deformation of the core elements due to heat or earthquakes, for example. These core elements are arranged closely to each other with small gaps therebetween in a high temperature fluid in the reactor core, so that the core elements moves complicatedly upon occurrence of an earthquake, for example, and particularly, some of core elements adjacent the core support frame may be often subjected to a relatively large collision force due to collision of the core elements and the support frames. For such a reason as described above, it is desired to design core constituting members so that the core support frames can suppress deformation of the core elements due to heat or earthquake and reduce the reaction force of the support frames and core elements as much as possible. In addition, it is desired to improve an earthquake-proof capability of the core element themselves.

However, the defects described above cannot be obviated by the core support frames of prior art which are firmly secured to the reactor core.

SUMMARY OF THE INVENTION

Accordingly, an object of this invention is to provide apparatus for supporting a reactor core capable of suppressing thermal deformation of core elements to a minimum, reducing collision force of core support frames with core elements, and suppressing the vibration of the core elements.

According to this invention, there is provided apparatus for supporting reactor core comprising a support frame for supporting core elements and a friction damper through which the support frame is secured to an inner wall of a reactor vessel.

DESCRIPTION OF THE PREFERRED EMBODIMENT

Figure 1:
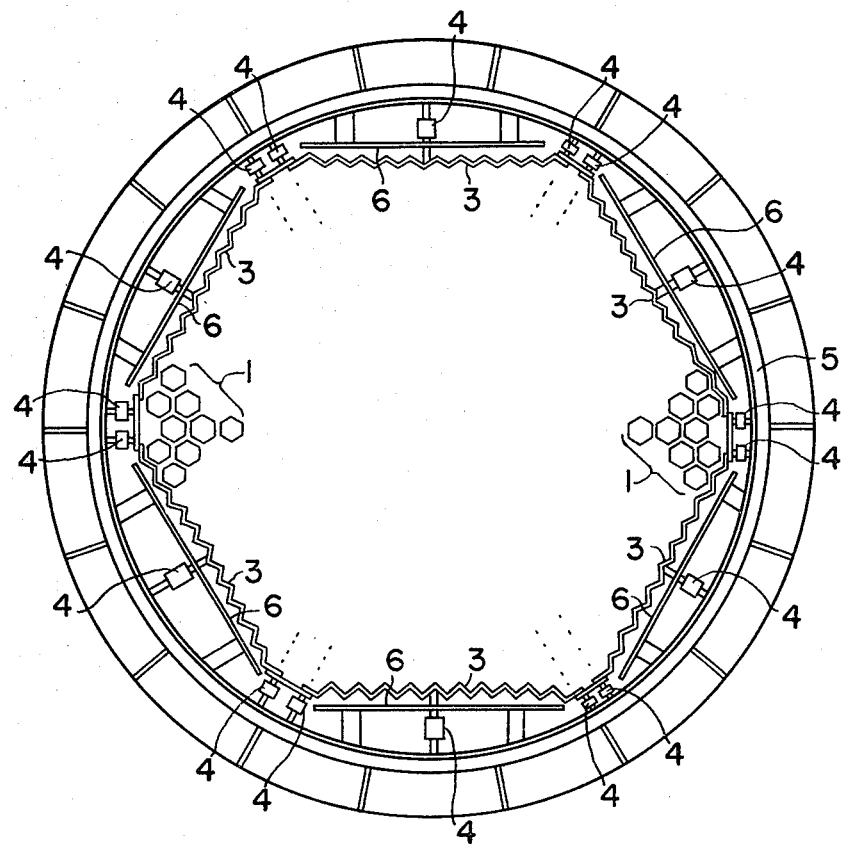
FIG. 1 shows a horizontal cross-section of one preferred embodiment according to this invention.
Figure 2:
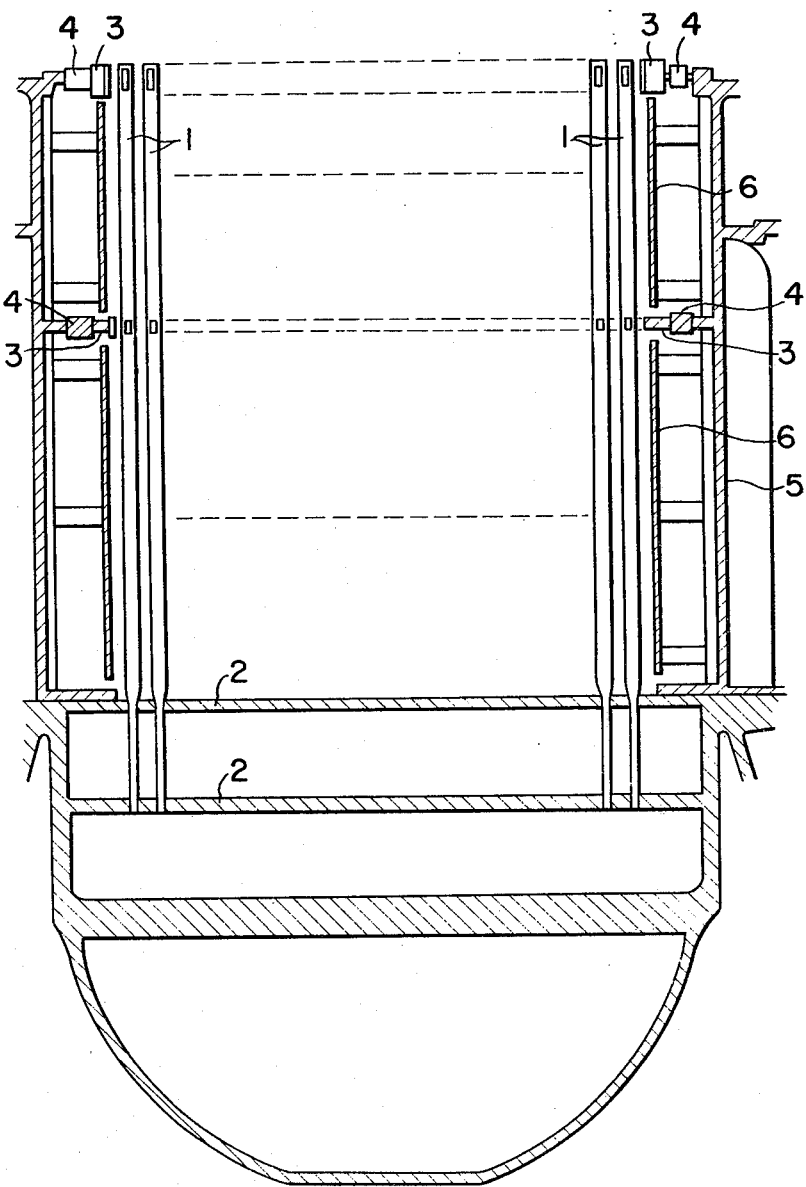
FIG. 2 shows a vertical cross-section of the embodiment shown in FIG. 1.

Referring to FIGS. 1 and 2, core elements 1 are supported by predetermined portions of supporting plates 2 in a nuclear reactor core by inserting the respective core elements into corresponding holes provided through the plates 2. The core elements 1 are surrounded by core support frames 3 at the upper and intermediate portions of the core elements as shown in FIG. 2. The support frames 3 are attached to an inner wall of a reactor vessel 5 through friction dampers 4, which will be described in detail hereunder in conjunction with FIG. 3, and the core elements 1 are further surrounded by heat shielding plates 6 as shown in FIG. 2.

Figure 3:
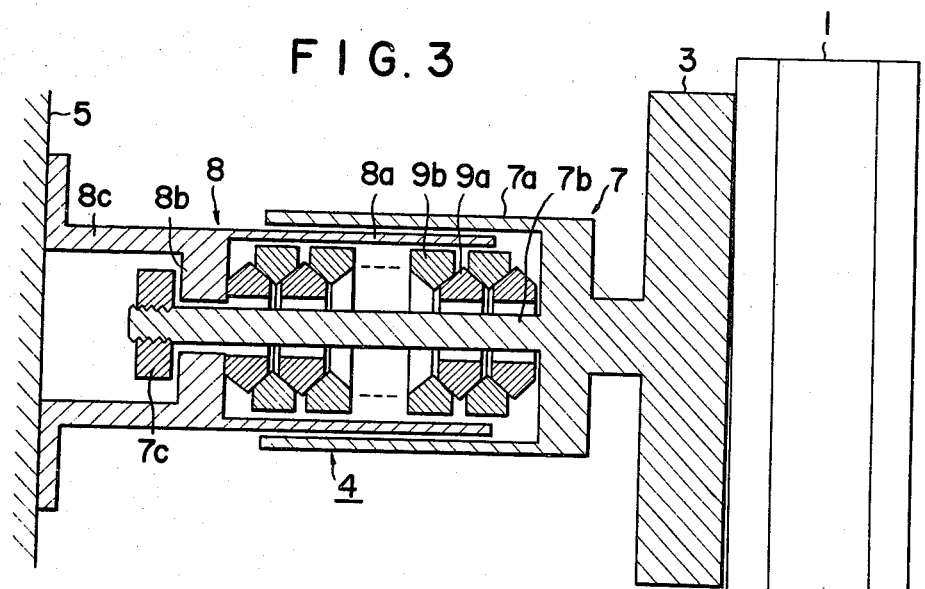
FIG. 3 shows a cross-section of a friction damper according to this invention.

The friction damper 4 comprises cylindrical supporting members 7 and 8 which are loosely telescoped with each other. The cylindrical supporting member 7 projects from the support frame towards the inner wall of the reactor vessel 5 and comprises a cylindrical portion 7a having an open end facing the inner wall 5, a shaft portion 7b concentric with the cylindrical portion 7a and extending through the open end, and an annular head 7c mounted on the protruded end of the shaft 7b. The supporting member 8 projects from the inner wall of the reactor vessel 5 and comprises a cylindrical portion 8a which is loosely fitted into the cylindrical portion 7a of the supporting member 7 so as to be movable in opposite directions and a cylindrical chamber 8c connected to the inside of the cylindrical portion 8a through a partition wall 8b which is provided with a through hole having a diameter less than that of the annular head 7c. The front end of the shaft 7b provided with the head 7c is positioned inside the annular chamber 8c as shown in FIG. 3. The head 7c is threaded on the shaft 7b so that the length of the shaft 7b in the chamber 8c can easily be adjusted. A ring spring 9 is arranged within the overlapped cylindrical portions 7a and 8a of the supporting members 7 and 8 about the shaft 7b. The ring spring 9 comprises a plurality of inner rings 9a each having a sectional configuration having triangular outer portion and outer rings 9b which engage corresponding inner rings so as to accord the outer inclined surfaces of the outer ring 9b with those of the inner rings 9a.

The numbers and the arrangement of the friction dampers 4 can be determined as desired, and supporting rigidity of the core support frame 3 is predetermined to be sufficient for suppressing the deformation of the core elements 1 under the normal operation of the nuclear reactor. The initial tension applied to the shaft 7b and the length of the friction damper 4 can be adjusted by adjusting the set position of the head 7 of the supporting member 7.

Figure 4:
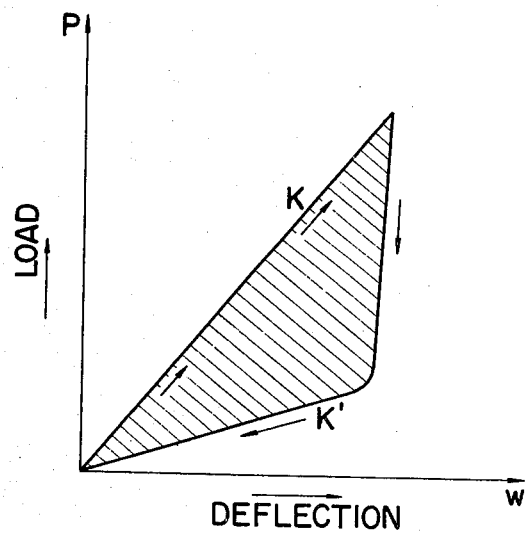
FIG. 4 shows a characteristic showing the relation between load and deflection of the damper shown in FIG. 3.

The friction damper 4 operates as follows. When the core elements 1 vibrate in the lateral direction and the compression force acts on the support frame 3 so as to move the supporting member 7 towards the inner wall of the reactor vessel 5, the inner rings 9a slide inwardly on the corresponding inclined surfaces of the outer rings 9b, and thus, the outer rings 9b are moved radially outwardly (in a direction apart from the shaft 7b). At this time, friction force generates between the inclined surfaces of the engaged inner and outer rings of somewhat triangular shaped ring spring 9, and a restraining force is then generated in the ring spring 9 against the inward movement of the inner rings 9a and the outward movement of the outer rings 9b. The load characteristics of the ring spring 9 is represented by FIG. 4 as a hysteresis loop and energy corresponding to the hatched area enclosed by the loop is absorbed by the spring. In FIG. 4, values K(at load increasing time) and K' (at load decreasing time) can easily be obtained by a known method.

The apparatus for supporting a reactor core according to this invention operates as follows in connection with the friction dampers 4 described above.

Upon occurrence of an earthquake, some of the core elements 1 collide with the support frame 3 and the collision force acts on the ring spring 9 in the friction damper 4. The ring spring 9 absorbs the collision energy and generates the restoring force as described hereinbefore. During the vibration of the core elements 1, the absorption of the collision energy and the generation of the restoring force will be repeated, thereby gradually attenuating the collision energy and the vibration of the core elements 1.

As described above, the core support frames can suppress the heat deformation of the fuel rods under the normal operation and can effectively absorb and reduce the collision energy or the force between the fuel rods and the support frames on an accident such as an earthquake, thereby increasing earthquake-proof capability of the nuclear reactor core.

The friction damper comprising a ring spring has a large rigidity and simple structure even in a relatively small size and has a high energy absorption efficiency in comparison with a viscous damper. The friction damper of this invention has a high energy attenuation capability and operates effectively with respect to collision force which acts in a moment on the fuel rods. In addition, since the friction damper is made of a metal such as stainless steel, it has an excellent heat resistant property, and moreover, a friction damper having a desired characteristic could be obtained by suitably arranging the inner or outer rings.

Thus, although the friction damper including a ring spring is most suitable for the use under a high temperature environment in a fast breeder reactor, a plate spring may be used instead of the ring spring. The support frames of this invention can also be used for a usual nuclear reactor.

I claim:

1. Apparatus for supporting a nuclear reactor core comprising a support frame for supporting core elements and a friction damper through which said support frame is secured to an inner wall of a reactor vessel, said friction damper comprising first and second cylindrical members which are loosely telescoped with each other and a ring spring disposed in said cylindrical members, said first cylindrical member being connected to said support frame and comprising a first cylindrical portion having an open end facing said inner wall of the reactor vessel, a shaft portion concentric with said first cylindrical portion and extending through said open end, and an annular head mounted on a protruded end of said shaft portion, said second cylindrical member being secured to said inner wall of the reactor vessel and comprising a second cylindrical portion and a cylindrical chamber connected to an inside of said second cylindrical portion through a partition wall which is provided with a through hole having a diameter less than that of said annular head, said annular head being positioned inside of said cylindrical chamber, said ring spring being arranged within said first and second cylindrical portions about said shaft portion.

2. The apparatus according to claim 1 wherein said head of the first cylindrical member is mounted on said shaft portion so that the position of said head can be adjusted.

* * * * *